(12) United States Patent
Wen et al.

(10) Patent No.: US 9,367,621 B2
(45) Date of Patent: *Jun. 14, 2016

(54) AUTOMATIC UPDATE OF SEARCHES

(71) Applicant: eBay Inc., San Jose, CA (US)

(72) Inventors: Wen Wen, Cupertino, CA (US); Patricia Ng, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/159,339

(22) Filed: Jan. 20, 2014

(65) Prior Publication Data

US 2014/0324807 A1 Oct. 30, 2014

Related U.S. Application Data

(63) Continuation of application No. 13/572,493, filed on Aug. 10, 2012, now Pat. No. 8,635,202, which is a continuation of application No. 13/284,717, filed on Oct. 28, 2011, now Pat. No. 8,244,709, which is a continuation of application No. 12/751,679, filed on Mar. 31, 2010, now Pat. No. 8,051,064, which is a continuation of application No. 09/539,167, filed on Mar. 29, 2000, now Pat. No. 7,720,833.

(60) Provisional application No. 60/179,645, filed on Feb. 2, 2000.

(51) Int. Cl.
*G06F 17/30* (2006.01)
*G06Q 30/06* (2012.01)
*G06Q 30/08* (2012.01)

(52) U.S. Cl.
CPC .... *G06F 17/30864* (2013.01); *G06F 17/30554* (2013.01); *G06F 17/30867* (2013.01); *G06Q 30/0623* (2013.01); *G06Q 30/08* (2013.01)

(58) Field of Classification Search
USPC .................. 707/706, 728, 754, 758; 715/751
See application file for complete search history.

(56) References Cited

U.S. PATENT DOCUMENTS

| | | | |
|---|---|---|---|
| 5,388,255 A | 2/1995 | Pytlik et al. | |
| 5,465,303 A | 11/1995 | Levison et al. | |
| 5,623,652 A * | 4/1997 | Vora et al. | 707/742 |
| 5,710,469 A | 1/1998 | Ries | |
| 5,715,443 A * | 2/1998 | Yanagihara et al. | |
| 5,790,790 A | 8/1998 | Smith et al. | |

(Continued)

FOREIGN PATENT DOCUMENTS

EP 1039399 A1 9/2000

OTHER PUBLICATIONS

"U.S. Appl. No. 14/230,900, Preliminary Amendment filed Apr. 1, 2014", 7 pgs.

(Continued)

*Primary Examiner* — Hanh Thai
(74) *Attorney, Agent, or Firm* — Schwegman, Lundberg & Woessner, P.A.

(57) ABSTRACT

A method and system for automatically updating searches are described. In one embodiment, a first search result may be compared with a second search result to automatically identify at least one data item within the first search result that is changed relative to the second search result. The at least one data item may comprise a transaction term. A notification of the at least one data item may be transmitted to a user device.

19 Claims, 16 Drawing Sheets

(56) References Cited

U.S. PATENT DOCUMENTS

| | | | |
|---|---|---|---|
| 5,835,896 A | 11/1998 | Fisher et al. | |
| 5,845,265 A | 12/1998 | Woolston | |
| 5,898,836 A | 4/1999 | Freivald et al. | |
| 5,913,208 A * | 6/1999 | Brown | G06F 17/30696 707/706 |
| 5,978,842 A | 11/1999 | Noble et al. | |
| 5,983,268 A | 11/1999 | Freivald et al. | |
| 6,012,087 A | 1/2000 | Freivald et al. | |
| 6,047,264 A | 4/2000 | Fisher et al. | |
| 6,061,448 A | 5/2000 | Smith et al. | |
| 6,085,176 A | 7/2000 | Woolston | |
| 6,088,707 A | 7/2000 | Bates et al. | |
| 6,119,137 A | 9/2000 | Smith et al. | |
| 6,169,992 B1 | 1/2001 | Beall et al. | |
| 6,175,831 B1 | 1/2001 | Weinreich et al. | |
| 6,178,408 B1 | 1/2001 | Copple et al. | |
| 6,192,407 B1 | 2/2001 | Smith et al. | |
| 6,202,051 B1 | 3/2001 | Woolston | |
| 6,219,818 B1 | 4/2001 | Freivald et al. | |
| 6,243,691 B1 | 6/2001 | Fisher et al. | |
| 6,249,282 B1 | 6/2001 | Sutcliffe et al. | |
| 6,289,337 B1 | 9/2001 | Davies et al. | |
| 6,292,796 B1 | 9/2001 | Drucker et al. | |
| 6,311,178 B1 | 10/2001 | Bi et al. | |
| 6,366,582 B1 * | 4/2002 | Nishikado | H04L 49/309 370/352 |
| 6,405,175 B1 | 6/2002 | Ng | |
| 6,415,270 B1 | 7/2002 | Rackson et al. | |
| 6,421,675 B1 | 7/2002 | Ryan et al. | |
| 6,457,004 B1 * | 9/2002 | Nishioka | G06F 17/3061 |
| 6,463,431 B1 | 10/2002 | Schmitt | |
| 6,464,431 B1 | 10/2002 | Mcnulty | |
| 6,487,553 B1 | 11/2002 | Emens et al. | |
| 6,519,584 B1 * | 2/2003 | Tognazzini | G06F 3/0481 705/14.4 |
| 6,584,460 B1 | 6/2003 | Iwayama et al. | |
| 6,606,653 B1 | 8/2003 | Ackermann, Jr. et al. | |
| 6,735,615 B1 | 5/2004 | Iwayama et al. | |
| 6,834,306 B1 | 12/2004 | Tsimelzon | |
| 6,847,972 B1 * | 1/2005 | Vernau et al. | |
| 6,862,713 B1 | 3/2005 | Kraft et al. | |
| 6,892,196 B1 | 5/2005 | Hughes | |
| 7,236,969 B1 * | 6/2007 | Skillen | G06F 17/30864 707/706 |
| 7,720,833 B1 | 5/2010 | Wen et al. | |
| 7,865,546 B1 | 1/2011 | Tuzhilin et al. | |
| 8,051,064 B2 | 11/2011 | Wen et al. | |
| 8,244,709 B2 | 8/2012 | Wen et al. | |
| 8,635,202 B2 | 1/2014 | Wen et al. | |
| 2002/0027567 A1 | 3/2002 | Niamir | |
| 2010/0191714 A1 | 7/2010 | Wen et al. | |
| 2011/0055190 A1 * | 3/2011 | Alexander | G06F 17/30887 707/706 |
| 2012/0041962 A1 | 2/2012 | Wen et al. | |
| 2012/0303613 A1 | 11/2012 | Wen et al. | |

OTHER PUBLICATIONS

"U.S. Appl. No. 14/231,176, Preliminary Amendment filed Apr. 1, 2014", 7 pgs.

"Change detection and notification", Wikipedia, [Online]. Retrieved from the Internet: <URL: http://en.wikipedia.org/wiki/Change_detection_and_notification>, (Accessed Mar. 24, 2014), 2 pgs.

"eBay Adds Email Notification", CNET News, [Online]. Retrieved from the Internet: <URL: http://news.cnet.com/eBay-adds-email-notification/2100-1017_3-224894.html>, (Apr. 23, 1999), 2 pgs.

"NetMind", Wikipedia, [Online]. Retrieved from the Internet: <URL: http://en.wikipedia.org/wiki/NetMind>, (Accessed Mar. 24, 2014), 1 pg.

"NetMind Architecture Design Considerations", [Online]. Retrieved from the Internet: <URL: http://web.archive.org/web/19990209060154/http://www.netmind.com/html/ArchitectDesign.html>, (Feb. 9, 1999), 3 pgs.

"NetMind for Enterprises", [Online]. Retrieved from the Internet: <URL: http://web.archive.org/web/19990219175436/http://www.netmind.com/html/enterprises.html>, (Feb. 19, 1999), 4 pgs.

"NetMind Powers eBay's New Personal Shopper Service", [Online]. Retrieved from the Internet: <URL: http://www.thefreelibrary.com/NetMind+Powers+eBay's+New+Personal+Shopper+Service.-a054450382>, (Apr. 23, 1999), 3 pgs.

"NetMind Technologies Delivers Personalization Solutions for Industry Leaders", PR Newswire, (Jan. 4, 2000), 4 pgs.

"NetMine, eBay Create Personal Shopper", [Online]. Retrieved from the Internet: <URL: http://www.internetnews.com/bus-news/article.php/104431/NetMind+eBay+Create+Personal+Shopper.htm>, (Apr. 23, 1999), 1 pg.

"Products site", [Online]. Retrieved from the Internet: <URL: http://web.archive.org/web/19990221175547/http://www.netmind.com/html/products.html>, (Feb. 21, 1999), 3 pgs.

"Change detection and notification", Wikipedia, [Online]. Retrieved from the Internet: <URL: http://en.wikipedia.org/wiki/Change_detection_and_notification>, (Accessed Mar. 24, 2014), 2 pgs.

"NetMind Architecture Design Considerations", [Online]. Retrieved from the Internet: <URL: http://web.archive.org/web/19990209060154/http://www.netmind.com/html/ArchitectDesign.html>, 3 pgs.

"U.S. Appl. No. 09/539,167, Advisory Action mailed Dec. 16, 2002", 3 pgs.

"U.S. Appl. No. 09/539,167, Appeal Brief filed Feb. 4, 2008", 33 pgs.

"U.S. Appl. No. 09/539,167, Appeal Brief filed Aug. 9, 2006", 30 pgs.

"U.S. Appl. No. 09/539,167, Examiner Interview Summary mailed Feb. 6, 2004", 2 pgs.

"U.S. Appl. No. 09/539,167, Examiner Interview Summary mailed Jul. 1, 2002", 3 pgs.

"U.S. Appl. No. 09/539,167, Examiner Interview Summary mailed Nov. 20, 2007", 2 pgs.

"U.S. Appl. No. 09/539,167, Final Office Action mailed Mar. 10, 2006", 13 pgs.

"U.S. Appl. No. 09/539,167, Final Office Action mailed Apr. 7, 2004", 8 pgs.

"U.S. Appl. No. 09/539,167, Final Office Action mailed May 13, 2005", 11 pgs.

"U.S. Appl. No. 09/539,167, Final Office Action mailed Sep. 4, 2007", 8 pgs.

"U.S. Appl. No. 09/539,167, Final Office Action mailed Sep. 19, 2002", 8 pgs.

"U.S. Appl. No. 09/539,167, Non Final Office Action mailed Feb. 26, 2007", 9 pgs.

"U.S. Appl. No. 09/539,167, Non Final Office Action mailed Apr. 19, 2002", 7 pgs.

"U.S. Appl. No. 09/539,167, Non Final Office Action mailed Sep. 12, 2005", 9 pgs.

"U.S. Appl. No. 09/539,167, Non Final Office Action mailed Oct. 30, 2003", 6 pgs.

"U.S. Appl. No. 09/539,167, Non Final Office Action mailed Nov. 23, 2004", 7 pgs.

"U.S. Appl. No. 09/539,167, Notice of Allowance mailed Jan. 4, 2010", 8 pgs.

"U.S. Appl. No. 09/539,167, Pre-Appeal Brief Request filed May 31, 2006", 4 pgs.

"U.S. Appl. No. 09/539,167, Pre-Appeal Brief Request filed Dec. 4, 2007", 5 pgs.

"U.S. Appl. No. 09/539,167, Preliminary Amendment filed Jan. 17, 2003", 17 pgs.

"U.S. Appl. No. 09/539,167, Reply Brief filed Jun. 6, 2008", 10 pgs.

"U.S. Appl. No. 09/539,167, Response filed Feb. 17, 2005 to Non Final Office Action mailed Nov. 23, 2004", 16 pgs.

"U.S. Appl. No. 09/539,167, Response filed Feb. 27, 2004 to Non Final Office Action mailed Oct. 30, 2003", 13 pgs.

"U.S. Appl. No. 09/539,167, Response filed Jun. 21, 2007 to Non Final Office Action mailed Feb. 26, 2007", 16 pgs.

"U.S. Appl. No. 09/539,167, Response filed Jul. 7, 2004 to Final Office Action mailed Apr. 7, 2004", 13 pgs.

"U.S. Appl. No. 09/539,167, Response filed Jul. 11, 2002 to Non Final Office Action mailed Apr. 19, 2002", 23 pgs.

(56) References Cited

OTHER PUBLICATIONS

"U.S. Appl. No. 09/539,167, Response filed Aug. 15, 2005 to Final Office Action mailed May 13, 2005", 17 pgs.

"U.S. Appl. No. 09/539,167, Response filed Nov. 18, 2002 to Final Office Action mailed Sep. 19, 2002", 12 pgs.

"U.S. Appl. No. 09/539,167, Response filed Dec. 12, 2005 to Non Final Office Action mailed Sep. 12, 2005", 15 pgs.

"U.S. Appl. No. 12/751,679, Final Office Action mailed Jun. 9, 2011", 8 pgs.

"U.S. Appl. No. 12/751,679, Non Final Office Action mailed Dec. 21, 2010", 18 pgs.

"U.S. Appl. No. 12/751,679, Notice of Allowance mailed Jul. 19, 2011", 9 pgs.

"U.S. Appl. No. 12/751,679, Response filed Mar. 21, 2011 to Non Final Office Action mailed Dec. 21, 2010", 12 pgs.

"U.S. Appl. No. 12/751,679, Response filed Jun. 24, 2011 to Final Office Action mailed Jun. 9, 2011", 6 pgs.

"U.S. Appl. No. 13/284,717, Non Final Office Action mailed Dec. 7, 2011", 9 pgs.

"U.S. Appl. No. 13/284,717, Notice of Allowance mailed Apr. 12, 2012", 9 pgs.

"U.S. Appl. No. 13/284,717, Response filed Feb. 6, 2012 to Non Final Office Action mailed Dec. 7, 2011", 7 pgs.

"U.S. Appl. No. 13/572,493, Non Final Office Action mailed Jan. 30, 2013", 8 pgs.

"U.S. Appl. No. 13/572,493, Notice of Allowance mailed Sep. 5, 2013", 9 pgs.

"U.S. Appl. No. 13/572,493, Response filed Apr. 30, 2013 to Non Final Office Action mailed Jan. 30, 2013", 6 pgs.

"Biddersedge.com", [Online]. Retrieved from the Internet: <URL:http://www.bidfind.com>, (Accessed Nov. 10, 2004), 1 pg.

"Bidfind Home p.", [Online]. [Archived Jan. 29, 1998]. Retrieved from the Internet: <URL: http://web.archive.org/web/19980126165429/www.bidfind.com/af/>, (Accessed Nov. 10, 2004), 1 pg.

Douglis, F., et al., "Tracking and Viewing Changes on the Web", AT & T Bell Lab., USENIX Technical conf.,, (1996), 1-13.

* cited by examiner

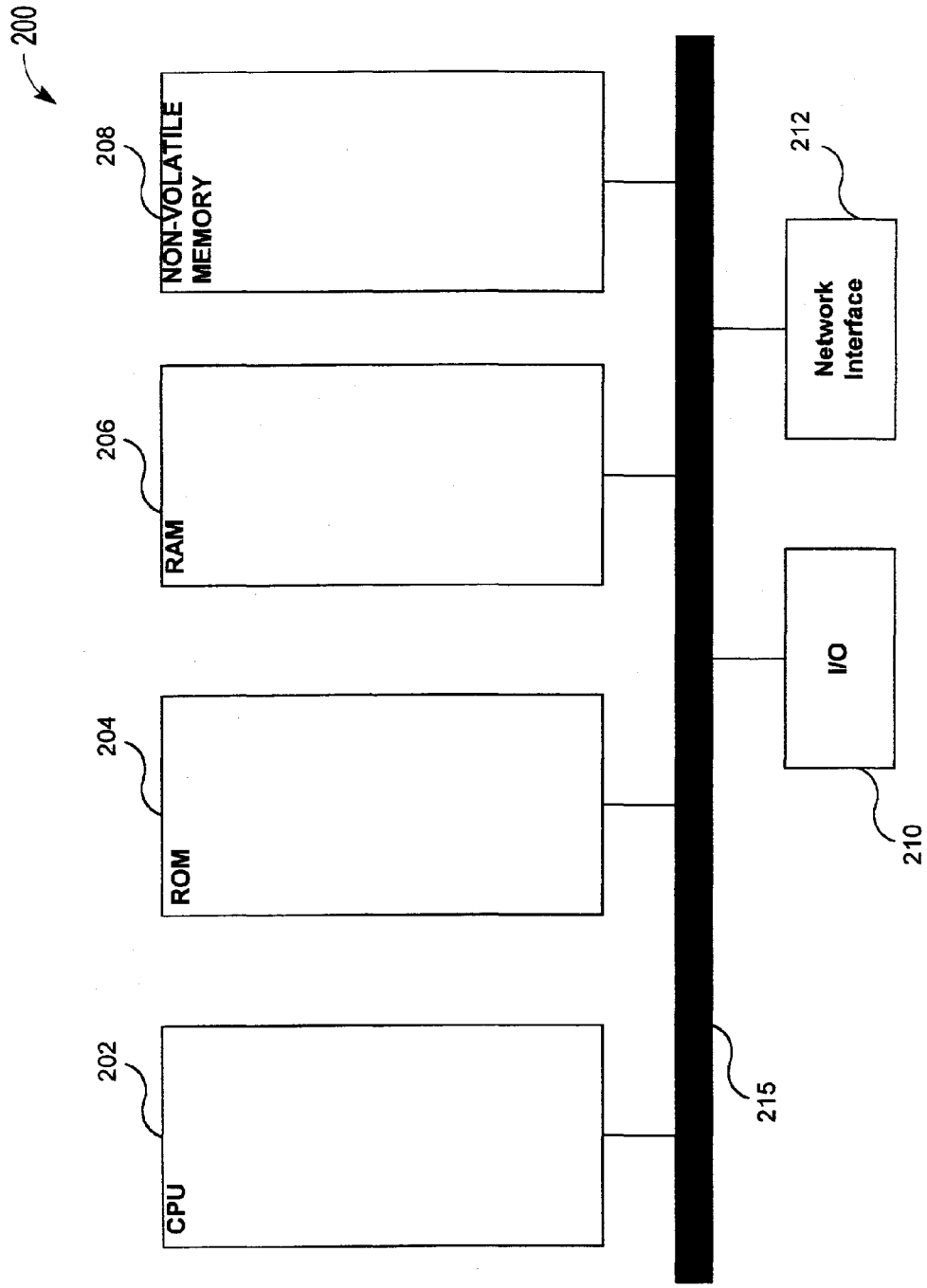

*800

| | home | my eBay | site map |
| eBay | Browse | Sell | Services | Search | Help | Community |
| | find items | find members | personal shopper |

▷ Shop with pictures in the Galley.
▷ Cruise around the NEW Auto category and Showroom!
▷ Apply now! Get your eBay Platinum Visa card today!

*702 [ Search ] tips
☐ Search title and descriptions
704

*personal*
SHOPPER Modify an Existing Search

*804*  *802*

| | |
|---|---|
| Search *806* | BMW M3<br>Type in what are you looking for (*e.g. teddy bear*). Click here for search tips<br>◉ Search Item Title only<br>○ Search Item Title and Description |
| Price Range | Between $ 7000 and $ _____ (optional) |
| Email Frequency | Daily ▽ —812   ↖808   ↖810<br>How often would you like to receive your Personal Shopper email? |
| Email Duration | 30 days ▽ —814<br>How long would you like to receive your Personal Shopper email? |

816 — [ Preview ] your Personal Shopper search.
818 — [ Undo ] your Personal Shopper search.

Announcements | Register | eBay Store | SafeHarbor | Feedback Forum | About eBay

```
                                       home | my eBay | site map
         eBaY    Browse | Sell | Services | Search | Help | Community
                       find items | find members | personal shopper personal
     SHOPPER Preview
     ┌─────────────────────────────────────────────────────────────┐
     │                    Search Criteria                          │
     ├─────────────────────────────────────────────────────────────┤
```

902 ⎰ Search           BMW M3
    ⎱ Search Scope     Item Title Only
      Price Range      Over $7000.00
      Email Frequency  Daily
      Email Duration   30 days Please review the search results below. If you need to modify your search, please go back to the previous page by clicking on BACK. If you decide to keep it, you can click on the Save button below.

904 — [Save]

|  | Search results based on the above criteria |  |  |  |
|---|---|---|---|---|
| 4 items found in current listings (only 4 of them displayed) | | | | |
| Item# | Item | Price | Bids | Start Time |
| 163088709 | 1997 BMW M3 (361 HP) | $20000.00 | 0 | 09/11 08:20 |
| 162887520 | For Sale: 97 BMW M3 / Silver | $31000.00 | 0 | 09/10 16:58 |
| 158455184 HOT! | 97 BMW M3 COUPE LEGAL NOTICE NO RESERVE PIC | $26200.00 | 50 | 09/05 13:41 |
| 157686381 | 95 BMW 325i Convertible Low miles Black CD PIC | $22000.00 | 19 | 09/03 20:28 |

906

Announcements | Register | eBay Store | SafeHarbor | Feedback Forum | About eBay

FIG. 9

FIG. 11 home | my eBay | site map
Browse | Sell | Services | Search | Help | Community
find items | find members | personal shopper 54 items found for the search "BMW". Showing items 1 to 50.

1304 — [BMW] [Go]  Email me new items with Personal Shopper — 1306
e.g. "brown bear" -teddy more tips 1308 — Price Range: Between $ [7000]  And $ [   ]
Sort by: [Starting Date ▽] ○ascending ⦿decending ☐ Search Descriptions  Search Completed Items

Search Results
Current Auctions
14:50:14 PDT

| Item# | Item | Price | Bids | Start Time |
|---|---|---|---|---|
| 164106983 | NEW! 1995 52Si BMW Mint Condition | $19500.00 | 0 | 09/13 09:49 |
| 164093955 | NEW! 1999 Plymouth Prowler new also: Mercedes BMW PIC | $50000.00 | 0 | 09/13 09:09 |
| 164062815 | NEW! 1994 BMW 318is, 2dr, 5sp. 77,000 actual miles PIC | $12500.00 | 0 | 09/13 07:10 |
| 163744868 | NEW! 1996 BMW 328I Covertible / 49k Miles! LOOK!! PIC | $18350.00 | 25 | 09/12 16:14 |
| 163725551 | NEW! 2000 BMW Z-3 2.8 Roadster | $39000.00 | 0 | 09/12 15:26 |
| 163636725 | 1994 BMW 530I Automatic with 82k miles! LOOK! PIC | $11001.00 | 15 | 09/12 12:42 |
| 163425635 | 1995 BMW 740 iL-Immaculate PIC | $22100.00 | 14 | 09/11 20:52 |
| 163201847 | HOT! 97 bmw 740iL FACTORY WARRANTEE NO RESERVE PIC | $38100.00 | 41 | 09/11 13:41 |
| 163176945 | BMW 1998 528IA PIC | $25100.00 | 11 | 09/11 12:40 |
| 163088709 | 1997 BMW M3 (361HP) | $20000.00 | 0 | 09/11 08:20 |
| 162948344 | BMW 750IL RARE AND BEUTIFUL...LOW RESERVE PIC | $9600.00 | 23 | 09/10 19:00 |
| 162887520 | For Sale: 97 BMW M3 / Silver | $31000.00 | 0 | 09/10 16:58 |
| 162843619 | bmw Z3 1997 2.8 manual | $26900.00 | 0 | 09/10 14:53 |
| 162831561 | BMW 740i 1995 with 53k miles, low reserve PIC | $27600.00 | 2 | 09/10 14:13 |
| 162822176 | '88 Red BMW 325 | $7000.00 | 0 | 09/10 13:42 |
| 162648764 | 97 BMW R1100RT sport-touring dream machine PIC | $10700.00 | 0 | 09/09 23:30 |
| 162600200 | 99 BMW 323iS 7K Miles, flawless Cosmos Black | $22600.00 | 26 | 09/09 22:59 |
| 162586604 | 1993 BMW K1100LT Motorcycle Only 5,800 Miles! PIC | $7450.00 | 10 | 09/09 22:52 |
| 162503583 | BMW 850 1991 850i 8 Series CalypsoRed PIC | $27850.00 | 0 | 09/09 22:10 |
| 162469631 | 1993 BMW 418 IS AS NICE AS THEY GET!!!!!! | $7600.00 | 6 | 09/09 21:55 |
| 162371449 | 1995 BMW 318ti Red 41K miles | $10000.00 | 1 | 09/09 21:16 |
| 162359665 | BMW 635CSi, European Specs, 1985 PIC | $8450.00 | 0 | 09/09 21:11 |
| 1623298 | 70 '96 BMW K1100RS-GORGEOUS! NO RESERVE! PIC | $12000.00 | 0 | 09/09 21:00 |
| 162185766 | 1996 BMW Z3 1.9 L, Black/Tan, stick | $18000.00 | 0 | 09/09 20:05 |
| 162152513 | CLASSIC 1977 BMW 320I - RESTORED - MINT PIC | $17000.00 | 0 | 09/09 19:56 |
| 162131858 | 1993 BMW 325is | $12500.00 | 0 | 09/09 19:48 |
| 161726033 | BMW 740iL Dark Blue 1995 375000 miles PIC | $38500.00 | 0 | 09/09 17:20 |
| 161412937 | 1994 BMW 325IC CONVERTABLE PIC | $15000.00 | 1 | 09/09 14:43 |

| | | | |
|---|---|---|---|
| 161384092 1996 BMW RT1100 Motorcycle | $8200.00 | 17 | 09/09 14:26 |
| 161336652 1995 BMW 740i Luxury Sedan in MIAMI PIC | $19600.00 | 13 | 09/09 14:01 |
| 161290989 BMW 325i (1993) | $13000.00 | 0 | 09/09 13:37 |
| 161192120 HOT! BMW z3 M COUPE, fast sports car, w/o kidney PIC | $27100.00 | 34 | 09/09 12:44 |
| 160735989 *1996 BMW 318ia - Low Res. - Great Pix * | $15600.00 | 10 | 09/09 07:38 |
| 160663331 BMW 318 ti 96 | $19500.00 | 0 | 09/09 06:28 |
| 160546428 BMW Z3 AC-Schnitzer 2.8L Roadster In Black PIC | $26099.00 | 7 | 09/09 02:40 |
| 160521889 1997 BMW 540i 6spd 37Kkm Black on Black MINT! PIC | $30000.00 | 2 | 09/09 01:34 |
| 160469398 1989 BMW 325I | $9500.00 | 0 | 09/08 22:39 |
| 160284243 1997 BMW Z3 sliver/Black 26k mi. *mint*no/res PIC | $23000.00 | 0 | 09/08 17:43 |
| 160 271178 BMW 850i COUP V12/rare 6 SPEED WHITE/GRAY Az PIC | $24000.00 | 0 | 09/08 17:25 |
| 160200738 1997 BMW 540ia Performance Sedan In MIAMI PIC | $30100.00 | 10 | 09/08 15:02 |
| 160172410 1997 BMW 540i SIX SPEED--MINT!!!!! PIC | $34000.00 | 1 | 09/08 14:05 |
| 160055838 1993 greem BMW 525i Wagon sports car auto PIC | $11100.00 | 18 | 09/08 08:57 |
| 159992224 1991 BMW M5 Premium Supercar NO RESERVE PIC | $18499.00 | 0 | 09/07 23:19 |
| 159816472 1996 BMW 327is Sports coupe | $21500.00 | 0 | 09/07 18:38 |
| 159691559 1998 BMW Z3, green/tan, wholesale reserve! PIC | $21050.00 | 6 | 09/07 15:44 |
| 159664464 1973 BMW 3.0 CS - Classic | $9850.00 | 0 | 09/07 14:52 |
| 159624529 91 green/tan BMW Convertible | $9500.00 | 0 | 09/07 13:26 |
| 159605338 95 BMW 740I - Stunning - Low Reserve | $25100.00 | 9 | 09/07 12:46 |
| 159573352 1992 BMW 525i PIC | $7500.00 | 2 | 09/07 11:35 |
| 159547879 bmw 735i new condition 1990 | $11500.00 | 0 | 09/07 10:39 |

Items 1 to 50 matching the query "BMW".
Note: Bid counts and amounts may be slightly out of date.
Click on the specific item(s) you are interested in for up-to-date information.

go to TOP of page

Page 1    Next

Announcements | Register | eBay Store | SafeHarbor | Feedback Forum | About eBay

FIG. 13B

AUTOMATIC UPDATE OF SEARCHES

CROSS-REFERENCES TO RELATED APPLICATIONS

This application is a continuation of U.S. patent application Ser. No. 13/572,493 filed Aug. 10, 2012, which is a continuation of U.S. patent application Ser. No. 13/284,717 filed Oct. 28, 2011, which is a continuation of U.S. patent application Ser. No. 12/751,679 filed Mar. 31, 2010, which is a continuation of U.S. application Ser. No. 09/539,167, filed Mar. 29, 2000, and claims the benefit of U.S. Provisional Application Ser. No. 60/179,645 filed Feb. 2, 2000, all of which applications are incorporated herein by reference in their entireties.

TECHNICAL FIELD

The present invention relates to the retrieval of information over a network and more particularly to a change detection and notification system.

BACKGROUND

As networks and computers have been able to deliver information faster, users have begun to expect instantaneous information and information available from anywhere in the world. The vast amount of information available has created an overload of information for the user.

Internet search tools and search engines allow users to find information by searching for keywords throughout an index of millions of documents posted on websites. However, a problem with the search engines is the inability to receive updated information on specific pages. A user may frequently access the information on web pages to see if changes have occurred, but this is time consuming. Accessing information is tedious, particularly when information contained in a large database and large searches must be conducted.

Software tools have been developed to automate the task of detecting updates to information on web pages and within databases. These tools allow users to specify keywords which are periodically searched for in a news database. Some of these tools send news articles containing the specified keywords to the user by electronic mail (e-mail).

These automated software tools are sometimes known as "netbots", a network robot which automatically performs some task for a user. Netbots allow the users to manage the information within databases and reduce the amount of information that the user must read. Filtering of the information is critical to making good use of the overwhelming amount of information available to the user.

Change detection tools allow users to register a document or web page on the Internet and be notified when any change to that document occurs. The user registers a document by specifying the URL of the document and providing the user's e-mail address. The change detection tool stores a local copy of the document together with the user's e-mail address. Periodically (for example daily or weekly), the change detection tool access the source document specified by the URL and compares the retrieved source document to the local saved copy of the document. If a difference between the two copies is detected, a message is sent to the user's e-mail address notifying the user of the change in the document. These document change tools may store an actual copy of the entire document on the tools website for comparison. However, such tools are inefficient for retrieving updated information within a database, for example, an auction site. Because of the large amount of data within these sites, a user may be notified too often or with too much information for the updates to be useful. Often the user is notified of many insignificant changes and frequent e-mail notices of minor irrelevant changes become irritating to the user. In addition, such URL reminders notify the user only that a change has taken place and do not highlight the changes or indicate the changes to the user. Thus, the user must re-read the entire document to determine what has changed.

BRIEF DESCRIPTION OF THE DRAWINGS

Features and advantages will be apparent to one skilled in the art in light of the following detailed description in which:

FIG. 2 is a block diagram of one embodiment of an architecture of a computer system;

FIG. 8 illustrates an exemplary existing search and modification window;

FIG. 9 illustrates an exemplary search criteria preview and save window;

FIG. 11 illustrates an exemplary window existing search deletion window;

FIGS. 13A and 13B illustrate an exemplary search results window.

DETAILED DESCRIPTION

A method, apparatus, and system for automatically updating searches are described. In one embodiment, a first search result may be compared with a second search result to automatically identify at least one data item within the first search result that is changed relative to the second search result. The at least one data item may comprise a transaction term. A notification of the at least one data item may be transmitted to a user device.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. Although the search update system is described in terms of an auction site, the system and method may be used to automatically update searches of any database.

Some portions of the detailed description that follows are presented in terms of algorithms and symbolic representations of operations on data bits within a computer memory in the form of a computer program. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Figure 1:
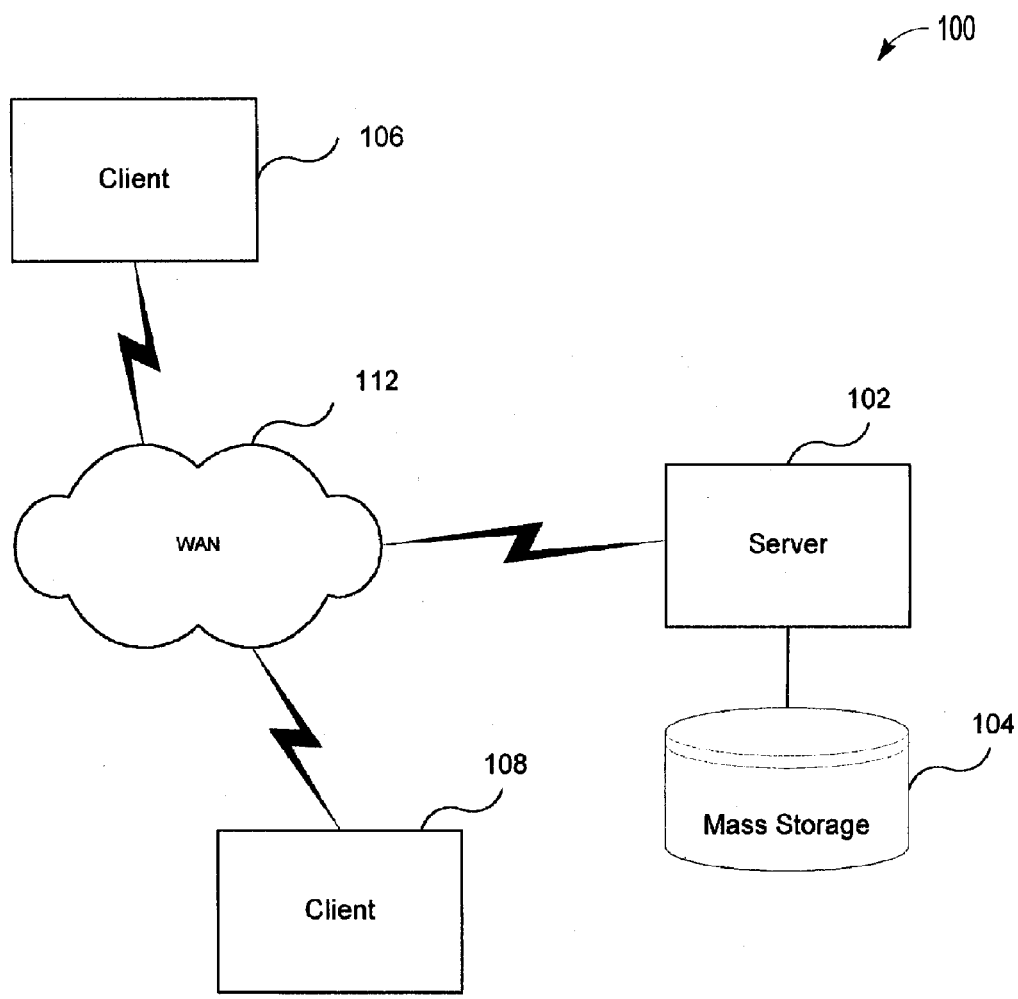
FIG. 1 is an illustration of one embodiment for a distributed auction site, search updating system.

FIG. 1 is a diagram of one embodiment for a distributed auction site, search updating system 100. Referring to FIG. 1, server 102 is coupled to mass storage device 104. Server 102 and mass storage device 104 are coupled via wide area network (WAN) 112 to a variety of clients 106 and 108. Wide area network 112 may be coupled to any of a variety of clients 106 and 108. In one embodiment, mass storage device 104 contains an auction item database, a modified or new item database, a search criteria database, and a search results database. In an alternate embodiment, each of the databases may be contained in a separate mass storage devices 104. A user accesses a server through client 106, 108 via wide area network 112 in order to enter items for sale in the auction item database, modify items for sale, and enter search criteria for searching for items within the auction item database. After the user enters all the information into the system 100, server 102 uses the search criteria to search for items within the auction item database. The search results are stored in the search results database and the user is notified that the search is complete. In one embodiment, the user is notified by an e-mail sent from server 102 via wide area network 112 to client 106, 108.

FIG. 2 is a block diagram of one embodiment for an architecture for a computer system 200. Referring to FIG. 2, CPU 202 is coupled via bus 215 to a variety of memory structures and input/output 210. The memory structures may include, for example, read only memory (ROM) 204, random access memory (RAM) 206, and/or non-volatile memory 208. In one embodiment, CPU 202 is also coupled via bus 215 to network interface 212. Network interface 212 is used to communicate between computer system 200 and server 102 and a variety of other computer terminals 108. Network interface 212 is coupled to the wide area network 112 by any of a variety of means such as, for example, a telephone connection via modem, a DSL line, or the like. The architecture shown in FIG. 2 may be utilized for either client 106, 108, server 102, or both.

Figure 3A:
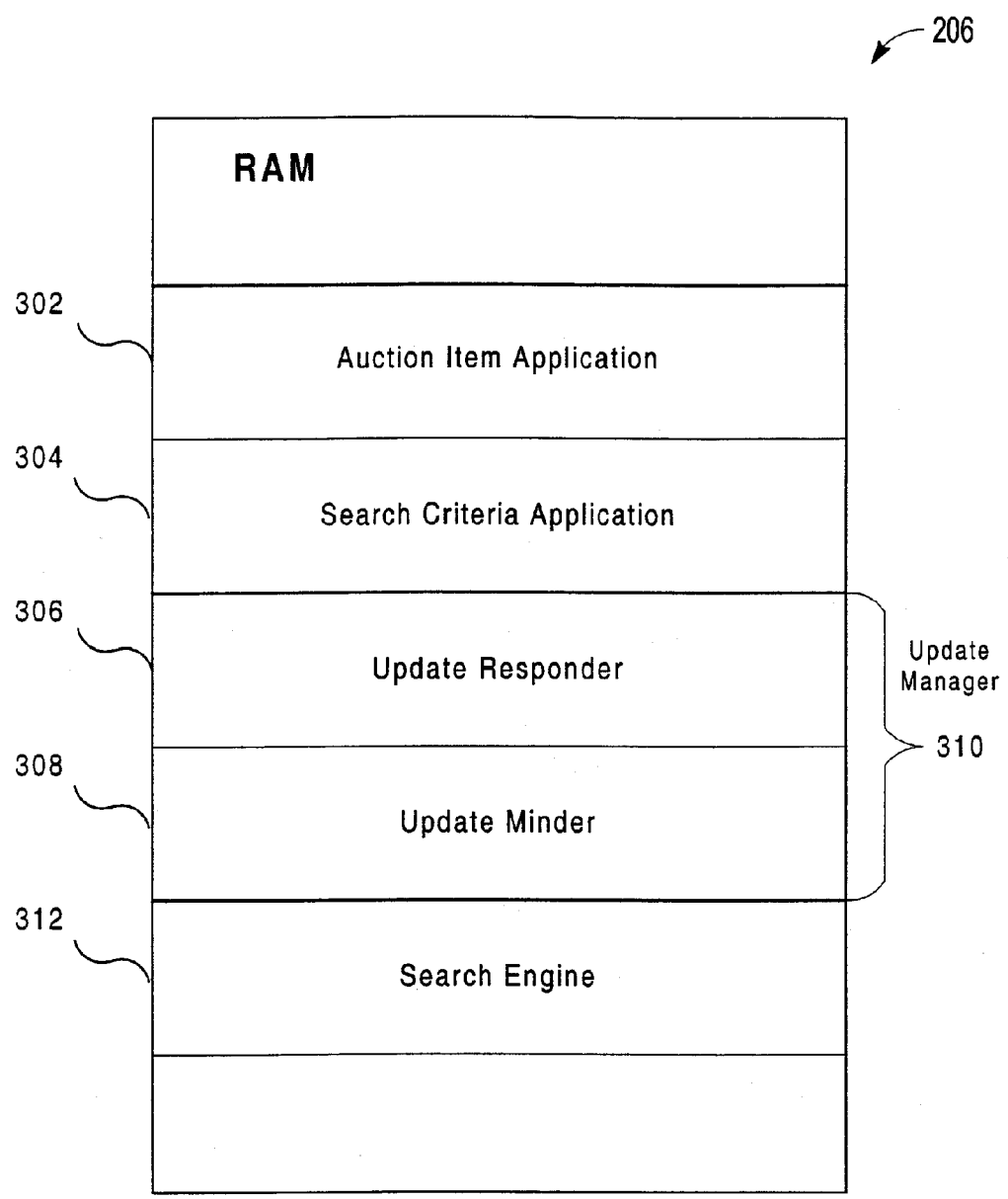
FIG. 3a is a block diagram of one embodiment for a random access memory, such as that shown in FIG. 2.

FIG. 3a is a block diagram of one embodiment for random access memory (RAM) 206. Referring to FIG. 3a, RAM 206 contains auction item application 302, search criteria application 304, search engine 312, and change-detection manager 310. Change-detection manager 310 includes update responder 306 and update detector 308. Auction item application 302 is used to add or modify items to the item database. Auction item application 302 interacts with the user via a graphical user interface (GUI) to set up items for sale. Search criteria application 304 is used to add, modify and delete search criteria for searching the item database. Search criteria application 304 interacts with the user via a GUI to set up criteria for searching the item database. Search engine 312 searches the item database using the search criteria entered through search criteria application 304. Update responder 306 handles communication between server 102 and the search engine software. Update detector 308 is responsible for performing the automatic update of the searches. In one embodiment, change-detection manager 310 is the NetMind Change-Detection tool provided by NetMind Services, Inc. of Campbell, Calif.

Figure 3B:
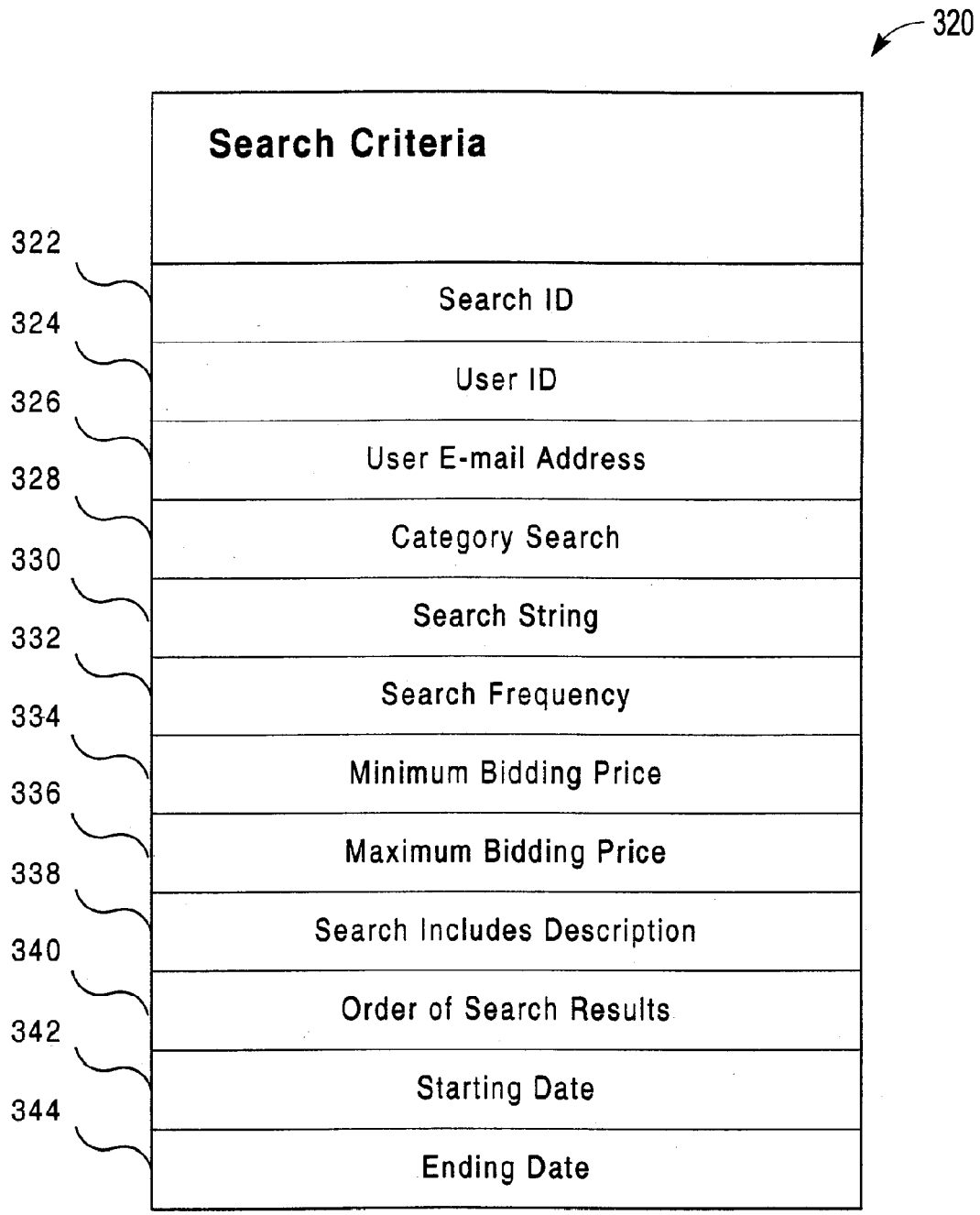
FIG. 3b is a block diagram of one embodiment of search criteria used in the system of FIG. 1.

FIG. 3b is a block diagram for one embodiment of search criteria 320 used in system 100. Referring to FIG. 3b, search criteria 320 may include a unique search ID 322, a user identification 324, user e-mail address 326, category indicator 328, search string 330, search frequency 332, minimum bidding price 334, maximum bidding price 336, search includes description 338, order of the search results 340, search starting date 342, and search ending date 344. The entries in search criteria 320 are entered through a GUI.

Search ID 322 is a unique identifier for the search criteria 320. In one embodiment, search ID 322 is automatically generated by system 100 when the search is saved. User ID 324 is a unique identifier for the user and is entered by the user when the user signs-up for the notification service. User e-mail address 326 is used to notify the user of the results of the updated search results. Category search 328 indicates the auction site category for the search. In one embodiment, the user may search items for sale based upon the item category (for example, autos, boats, or the like). Search string 320 contains the search data entered by the user for the search (for example, "BMW 3225i"). Search frequency 332 indicates how often a search update is performed. For example, search frequency 332 may indicate a daily, weekly, or monthly update. Minimum bidding price 334 contains the lowest bid price entered by the user for the item and maximum bidding price 336 contains the highest bid price entered by the user. Search includes description 338 is a tag that indicates whether the search is to be performed on the description of the item in addition to the title of the item. Order of search results 340 indicates whether the search results are displayed newest first or oldest first. Search starting date 342 indicates the date from which the search updates are performed. In one embodiment, search starting date 342 is automatically inserted by the system when the user saves the search information. Search ending date 344 indicates the date at which the search updates are to be concluded.

Figure 4:
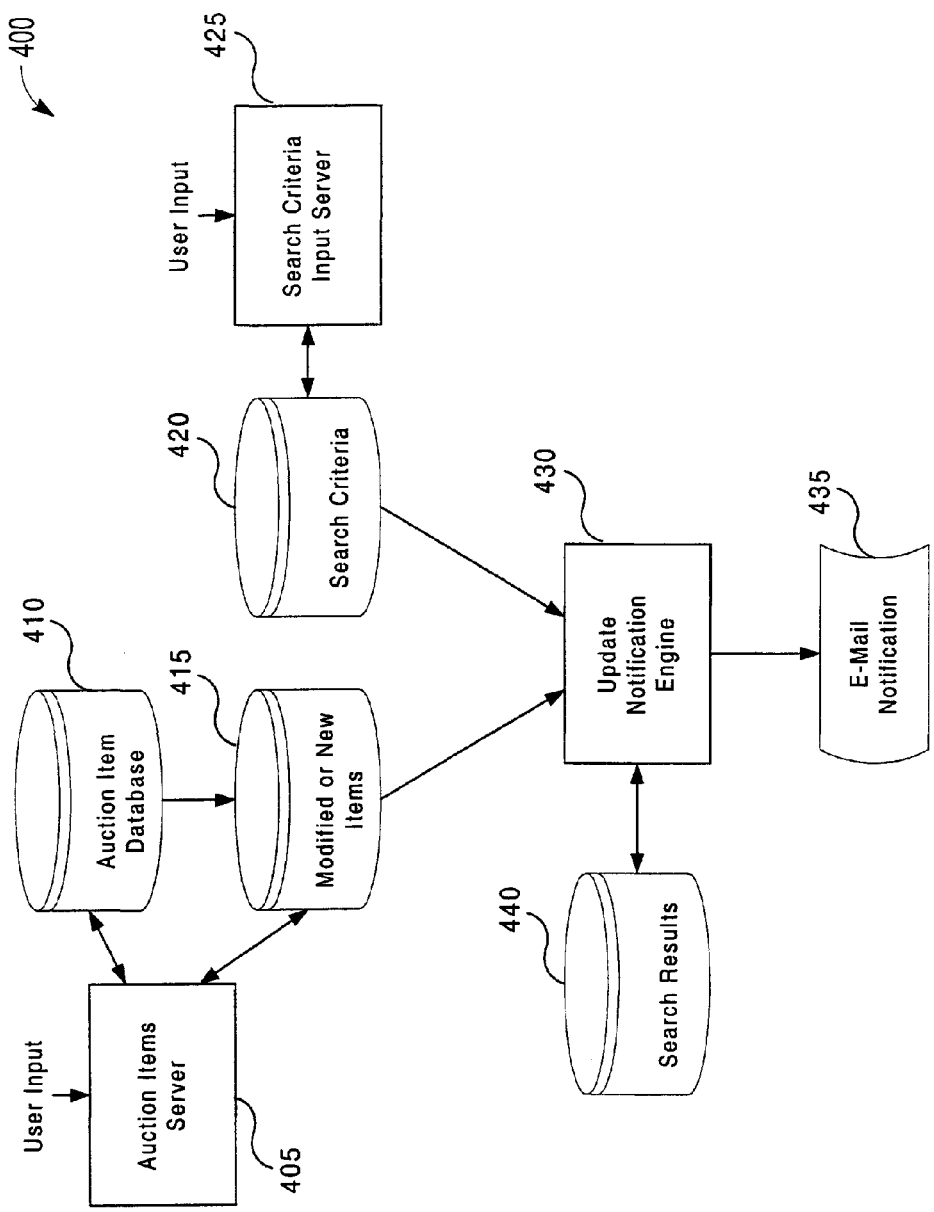
FIG. 4 is a block diagram of one embodiment for an auction site, search updating system.

FIG. 4 is a block diagram of one embodiment of an auction site, search updating system 400. Referring to FIG. 4, items processor 405 accesses item database 410 to add items to item database 410. Items are entered by a user through a GUI. Items processor 405 extracts new or modified items from item database 410 and places the extracted items in modified or new items database 415. The extraction of modified or new items is performed on a regular basis. For example, the extraction may be run on an hourly or nightly basis.

Search criteria input processor 425 downloads search criteria 320 into search criteria database 420. Search criteria 320 is input into the system 400 by the user through a GUI. In one embodiment, the user is queried at the time a search is initially entered into the system whether the user wishes to save the search for future updates. If the user does not wish to save the search, the search is performed on the item database 410 and the results displayed to the user. However, if the user wishes to save the search, search criteria input processor 425 performs an initial search against auction item database 410 and displays the search results on the user's terminal. In addition, search criteria input processor 425 saves search criteria 320 entered by the user in search criteria database 420.

Update notification engine 430 uses search criteria 320 from search criteria database 420 to search the modified or new items database 415 to create search results. The search results are stored in search result database 440. Update notification engine 430 compares search results on a periodic basis. The periodic basis is determined by search frequency 332. Thus, search criteria 320 may indicate that the search is performed and the comparison made on an hourly, nightly, or weekly basis. Update notification engine 430 runs the current search and compares the search results for the current search with search results from a prior run stored in search results database 440.

Update notification engine 430 retrieves search criteria 320 from search criteria database 420. Search criteria 320 is used to search the modified or new items database 415 and the results are transferred to update manager 310. Update detector 308 parses the new search results. In one embodiment, the search results are sorted in date order with the latest date first. Update detector 308 retrieves the previously stored search results from search result database 440 to make the comparison. In one embodiment, each auction item extracted from new or modified items database 415 is tagged with a beginning and ending tag. During the parsing, each result is divided into sections based upon the tags and the new search results are parsed and divided depending on the tags. In one embodiment, each tag section is then processed by a CRC generator to checksum each section. After all sections of the search results have been checksummed, the archived checksummed sections in search result database 440 for the corresponding search are compared to the current checksummed sections. If a match is found, then a section has not changed. However, if no match is found, then that particular auction item has changed. The changed items are saved in mail notification 435. After all comparisons have been made, the newest checksummed search results are saved in search result database 440 replacing the previous search results for the particular search.

Figure 4B:
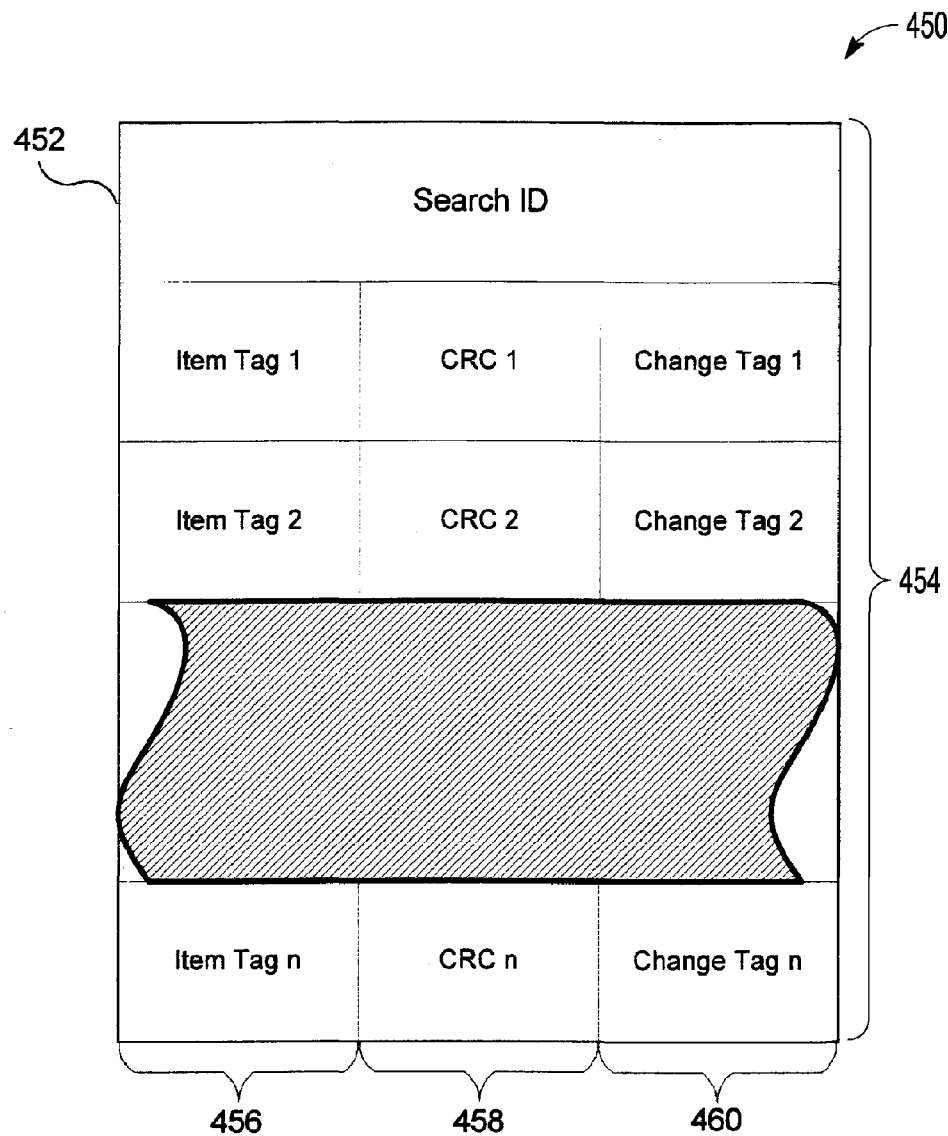
FIG. 4b is a block diagram of one embodiment of search results.

FIG. 4b is a block diagram of one embodiment of the search results 450. Each search result 450 contains a search ID 452 and a number of search result entries 454. Each search result entry 454 contains an item tag 456, checksum entry 458, and change tag 460. Search ID 452 corresponds to search ID 332. Item tags 456 are unique identification tags to each individual auction item contained within database 410. Checksums 458 are the checksum values generated by update detector 308 and change tags 460 are temporary data areas used by update detector 308 to determine if a change has occurred. In one embodiment, the change codes are initialized to 11 before processing. Any entries 454 whose change code remains 11 at the end of processing are new sections or changed sections. Change tags 460 keep track of type of change found. A change code is written into the change tags 460 for each entry 454 when a match is found or not found. In one embodiment, when a match is found, change tag 460 is set to 00 indicating that no change occurred in this section. After all archived sections in search result 450 have been compared, if all change tags 460 are 00, then no new sections or changes were found. However, entries 454 with change tags 460 other than 00 indicate that a change has occurred.

The results of the comparison are sent to the user via e-mail notification 435. In one embodiment, the notification is by an e-mail message sent from server 102 to client 106, 108. In alternate embodiments, any applicable notification system may be utilized such as, for example, notification by web page, by facsimile, or by pager. In one embodiment, the e-mail message contains the changed auction items retrieved from auction item database 410 or new and modified item database 415. In one embodiment, an e-mail notification is sent for each item that has been found to have changed. In an alternate embodiment, a single e-mail notification 435 will be sent out for each search criteria. E-mail may include not only the item found to have been new or changed, but also the unique search ID 322, user ID 324, the category based on the category searched 328, the search from search string 330, the frequency 332, minimum or maximum bidding prices 334, 336, whether the search included the description 338, the starting date 342, and ending date 344. In alternate embodiments, additional information may be also sent in the e-mail notification 435.

In one embodiment, update notification engine 430 retrieves searches from modified or new items database 415 on a daily basis. Update notification engine 430 executes the searches for each user for each search. In one embodiment, a user may save up to three searches at any one time. In alternate embodiments, any number of searches may be saved. A search may be active or inactive depending on search criteria 320. Whether a search is active for a particular execution is dependent upon the duration of a search and frequency 332 entered by the user. If update notification engine 430 finds a match for the search and the comparison shows that a change has occurred from a prior search, the results are sent to the user. In one embodiment, each search result is sent in a separate e-mail notification 435. If a search is not found or there has been no update since the prior search, update notification engine 430 sends notification message 435 to the user indicating that no match was found. In one embodiment, an e-mail notification 435 is sent only after a specific period of time to indicate that no matches have been found. For example, in one embodiment, if update notification engine 430 does not find an updated match for a week, a "still looking" message is sent to the user.

Update notification engine 430 also sends a notification 435 to the user that a search will expire. In one embodiment, the update notification engine 430 sends the expiration notice to the user 24 hours prior to the expiration of the search.

Figure 5:
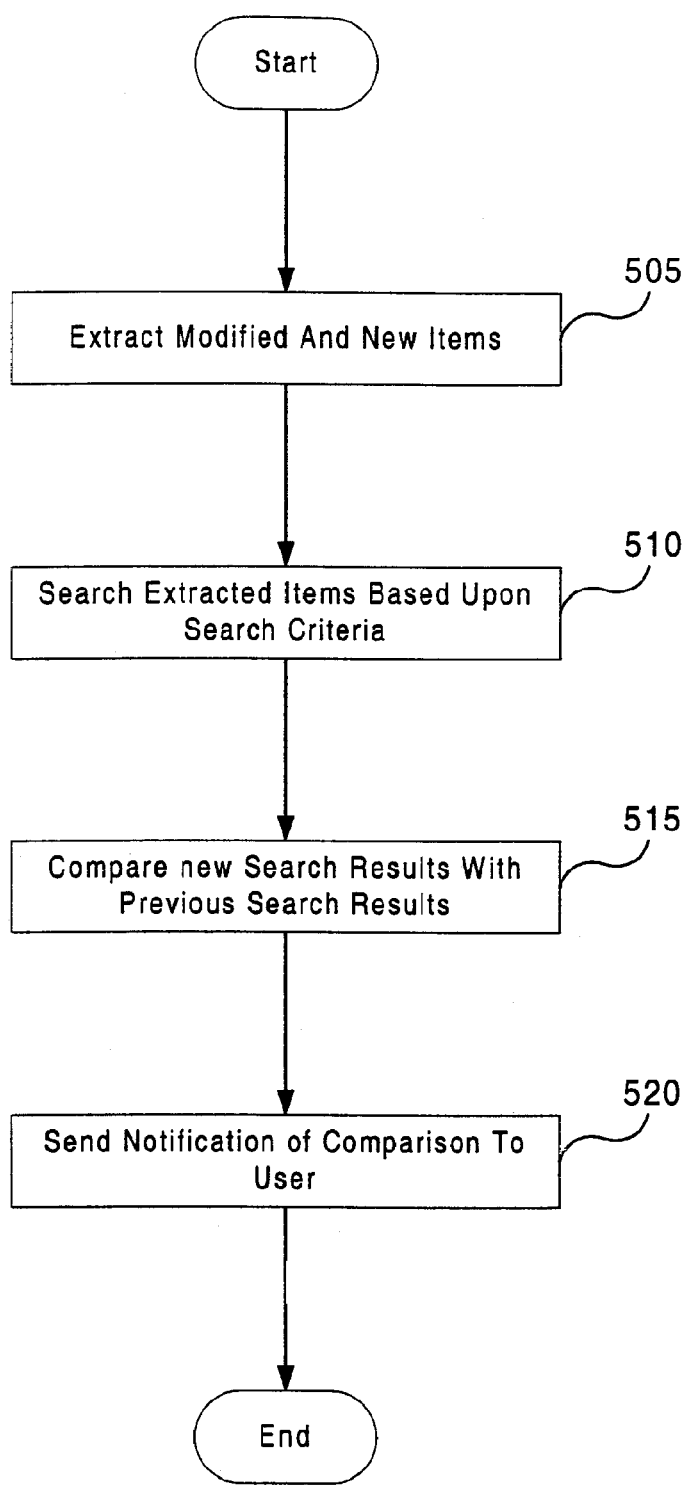
FIG. 5 is a flow diagram of one embodiment for automatically updating auction site searches.

FIG. 5 is a flow diagram of one embodiment for automatically updating auction site 100 searches. Initially at processing block 505, new and modified items for sale are extracted from item database 410 and placed into modified or new items database 415. In one embodiment, the extraction is performed on a periodic basis, for example, hourly or nightly. In addition, search criteria 320 are extracted from search criteria database 420. In one embodiment, search criteria 320 are extracted for each user and each user may have up to three search criteria.

At processing block 510, modified or new items database 415 is searched using the extracted search criteria 320 from search criteria database 420. Search results are saved in search results database 440. Any known searching method may be used to search the database.

At processing block 515, the search results for the new search are compared to the search results from a previous search. If any items have changed or are new, the particular items are tagged. Update notification engine 430 uses search criteria 320 from search criteria database 420 to search the modified or new items database 415 to create search results. The search results are stored in search result database 440. Update notification engine 430 compares search results on a periodic basis. The periodic basis is determined by search frequency 332. Thus, search criteria 320 may indicate that the search is performed and the comparison made on an hourly, nightly, or weekly basis. Update notification engine 430 runs the current search and compares the search results for the current search with search results from a prior run stored in search results database 440.

At processing block 520, the results of a comparison are sent to the user by e-mail notification. The results of the comparison are sent to the user via e-mail notification 435. In one embodiment, the notification is by an e-mail message sent from server 102 to client 106, 108. In alternate embodiments, any applicable notification system may be utilized. In one embodiment, the e-mail message contains the changed auction items retrieved from auction item database 410 or new and modified item database 415. In one embodiment, an e-mail notification is sent for each item that has been found to have changed. In an alternate embodiment, a single e-mail notification 435 will be sent out for each search criteria. E-mail may include not only the item found to have been new or changed, but also the unique search ID 322, user ID 324, the category based on the category searched 328, the search from search string 330, the frequency 332, minimum or maximum bidding prices 334, 336, whether the search included the description 338, the starting date 342, and ending date 344. In alternate embodiments, additional information may be also sent in the e-mail notification 435. In alternate embodiments, any appropriate notification method may be used.

Figure 6:
FIG. 6 illustrates an exemplary personal shopper user log-in window.

FIG. 6 illustrates an exemplary personal shopper user log-in window 600. Referring to FIG. 6, log-in window 600 includes user ID input area 602, password input area 604, and a remember me check box 610. In one embodiment, when a user signs onto the auction site and enters the search area, the user is presented with the user log-in screen 600. In an alternate embodiment, log-in window 600 may be displayed when a user enters a search string in any window in system 100. The user has the option of performing a one time search by entering a search criteria or search string in search string input area 606 and by checking the search titles and description check box 608. In one embodiment, the user may also create a personal shopper log-in by entering or creating a user ID and password in the appropriate areas 602, 604. The user may only save search criteria by creating a personal shopper log-in account.

Figure 7:
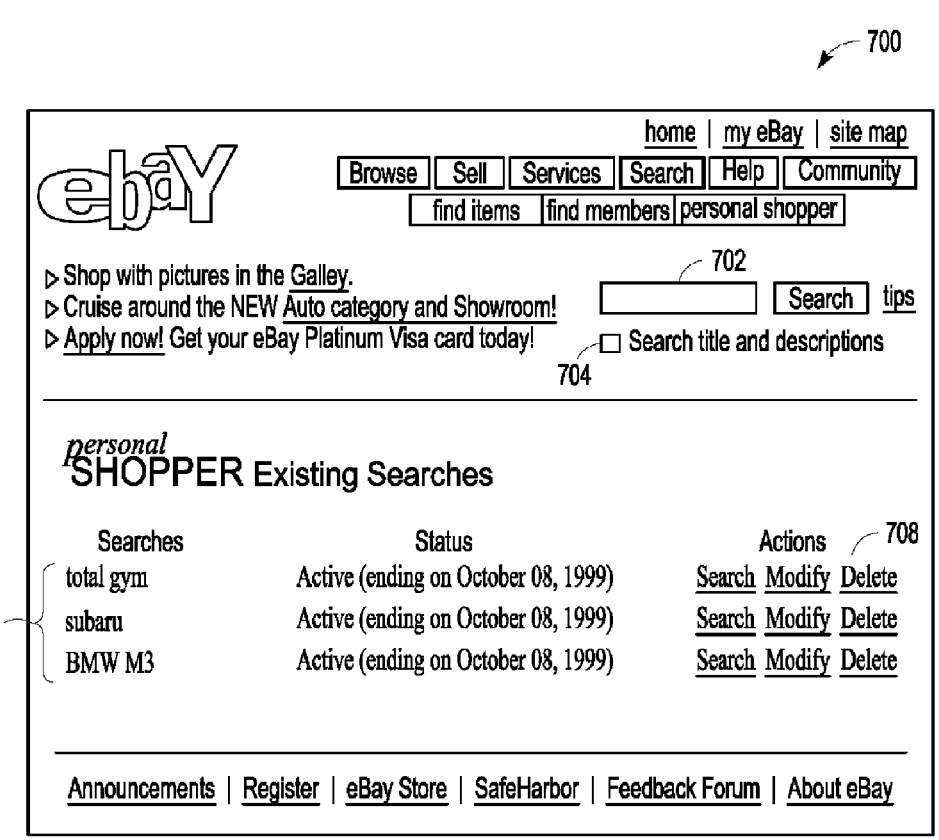
FIG. 7 illustrates an exemplary saved search results window.

FIG. 7 illustrates an exemplary saved search results window 700. Saved search results window 700 includes search string input area 702, search titles and description checkbox 704, and saved searches 706. In one embodiment, a user is allowed to save up to three searches at any given time. In an alternate embodiment, the user may save any number of searches. Saved search results 706 include the name of the search and the search status (that is, whether the search is active and the date at which it will end). In addition, saved searches 706 include save search actions 708 that the user may perform on the saved searches 706. For example, the user may search using the saved search, modify the saved search or delete the saved search.

FIG. 8 illustrates an exemplary existing search and modification window 800. Referring to FIG. 8, window 800 includes search modification dialog box 802. Search modification dialog box 802 includes search string input area 804, search item title or search item title and description check boxes 806, minimum price range input area 808, maximum price input area 810, notification frequency input area 812, and e-mail notification duration input area 814. In addition, window 800 includes a preview button 816 for previewing the search and an undo button 818 for undoing the input into dialog box 802. Dialog box 802 may be used for modification of existing searches or for the input of new searches. Information entered into dialog box 802 is saved in search criteria 320.

FIG. 9 illustrates an exemplary search criteria preview and save window 900. Referring to FIG. 9, search criteria 320 entered by the user within dialog box 802 is displayed in search criteria area 902. Window 900 also includes save button 904 for saving the search results into search criteria 320 and search results received from a search of database 415 in search results area 906. In one embodiment, the search results shown in search results area 906 show the first four items of items found in database 410. In an alternate embodiment, any number of search results may be shown in area 906.

Once the user saves the search by pressing save button 904, the information entered in dialog box 802 is saved in search criteria 320. The unique search ID 322 is generated for the search and the user identification (entered through user log-in window 600) is saved in user ID 324. User identification may be a combination of the user name and user password entered in log-in window of FIG. 6. Information entered in input area 804 is saved in search string 330. If a category had been chosen for the search, the category name will be placed in category search 328, the price range is placed in the minimum bidding and maximum bidding price 334 and 336, the frequency is entered into search frequency 332, an indication whether the search includes a description from 806 is placed into 338, and the starting date 342 and ending date 344 is generated from the e-mail duration. In one embodiment, starting date 342 is the date the search is entered or modified and ending date 344 is generated based upon the duration and starting date 342.

Figure 10:
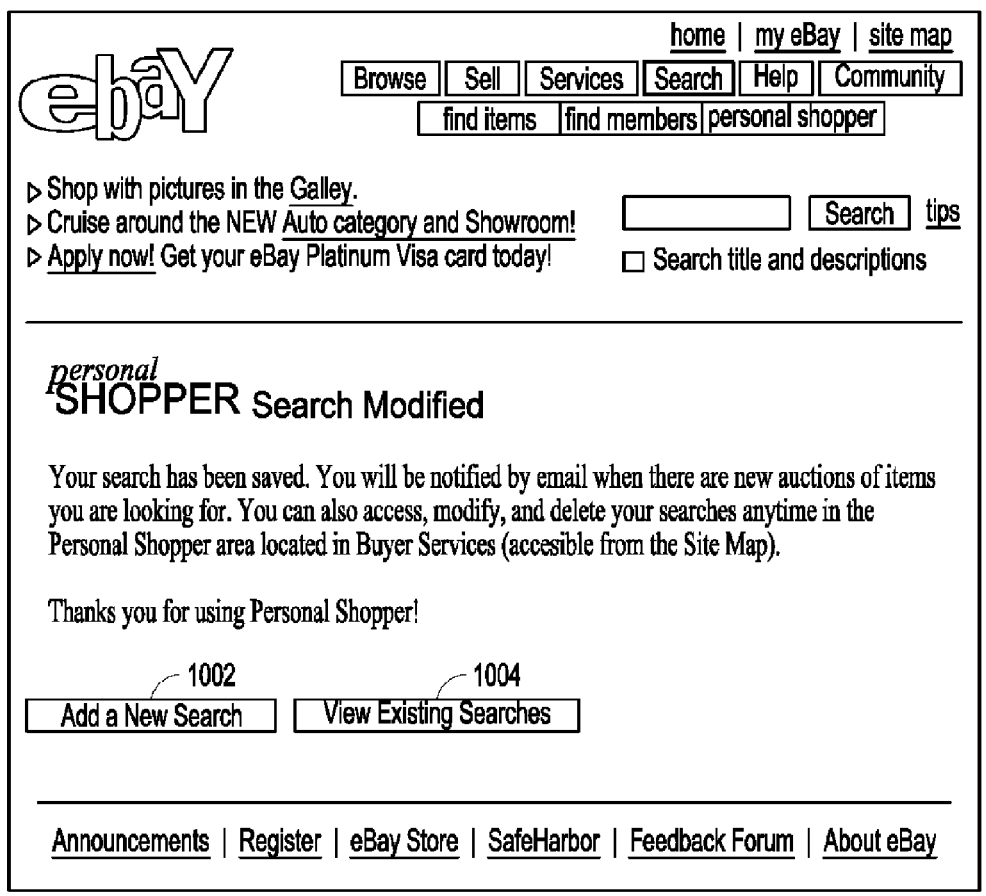
FIG. 10 illustrates an exemplary search modified verification window.

FIG. 10 illustrates an exemplary search modified verification window 1000. Referring to FIG. 10, window 1000 includes an add a new search button 1002 and a view existing searches button 1004. After save button 904 has been entered, window 1000 is presented to the user for verification of the save operation to either save another search or modify a saved search.

Figure 11:
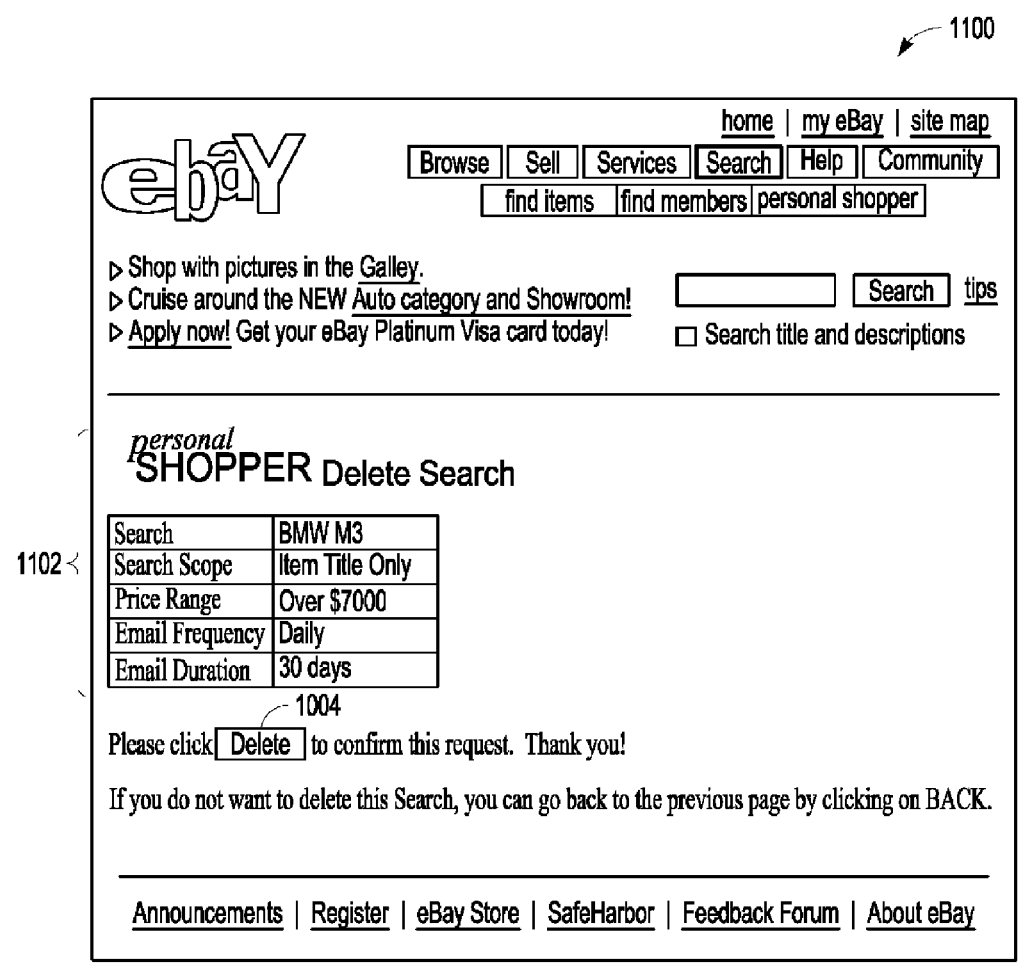

FIG. 11 illustrates an exemplary window existing search deletion window 1100. Referring to FIG. 11, a user may indicate that a search is to be deleted by entering the delete button in existing search actions area 708. After the user clicks or enters the delete action, window 1100 is displayed. Window 1100 includes the search to be deleted at 1102 and a delete button 1104. A user may delete the displayed search by clicking on the delete button 1104.

Figure 12:
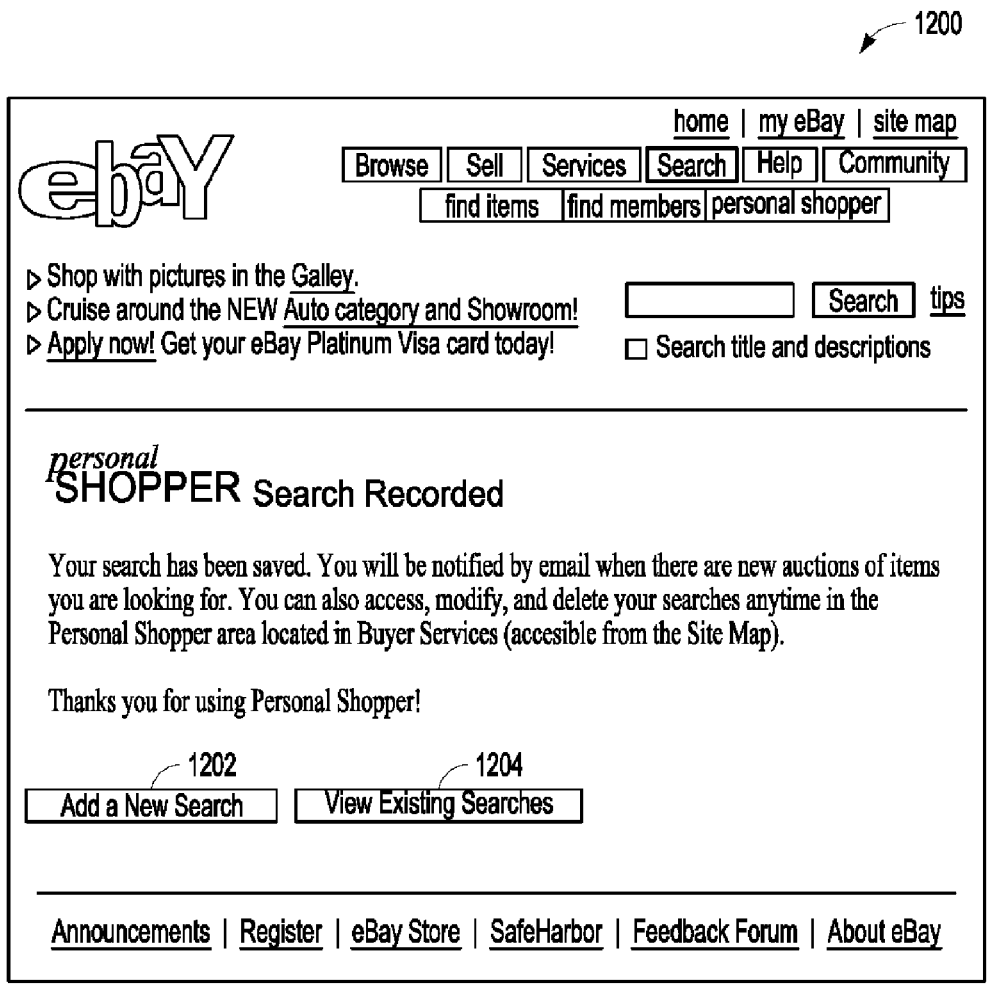
FIG. 12 illustrates art exemplary new search recorded verification window.

FIG. 12 illustrates an exemplary new search recorded verification window 1200. Referring to FIG. 12, verification window 1200 includes an add a new search button 1202 and a view existing search button 1204. Verification window 1200 may be displayed after the user has entered a new search in search dialog blocks 802 or through the search string input area 702 of any of the display screens of system 100.

FIGS. 13A and 13B illustrate an exemplary search results window. Referring to FIGS. 13A and 13B, the search results window is displayed whenever the user searches on an existing search or enters a search string in a search string input area 702. The search results window includes search string input area 1304, e-mail notification and update access area 1306, and other search criteria information 1308. In addition, the search results window includes search results area 1310. Items found based upon the search are displayed in search result area 1310. In one embodiment, the items are displayed beginning with the newest item through the oldest item found. The newest item is based upon the date the item was entered into the auction site or the date that the item was last updated. By clicking on e-mail notification access area 1306, the user may enter the input of saving searches. If the user has previously signed on, the clicking on 1306 will take the user to the search modification or input window 800 or if the user has not signed on, log-in window 600 will be displayed. By clicking on the e-mail notification access 1306, the search results displayed in search result area 1310 are saved in search results database 440. Each item in the search result area 1310 is tagged and a checksum (by the method as described above) is created for the item. The item number and checksum are saved in database 450.

The specific arrangements and methods herein are merely illustrative of the principles of this invention. Numerous modifications in form and detail may be made by those skilled in the art without departing from the true spirit and scope of the invention.

What is claimed is:

1. A method comprising:
identifying a data item that is changed within a first search result relative to a second search result, the data item being absent from the second search result and corresponding to a listed item, the identifying of the data item being performed by a processor of a machine; and
communicating a notification of the data item to a user device.

2. The method of claim 1, further comprising:
comparing the first search result with the second search result, wherein the identifying of the data item is based on the comparison.

3. The method of claim 2, wherein the comparing the first search result with the second search result includes parsing the first search result and performing a checksum on the parsed first search result.

4. The method of claim 2, wherein comparing the first search result with the second search result includes tagging the data item as being absent from the second search result.

5. The method of claim 4, wherein the communicating of the notification includes transmitting the data item tagged as being the listed item.

6. The method of claim 1, further comprising:
receiving search criteria from the user device;
performing the current search based on the search criteria received from the user device; and
retrieving the current search result in response to the performing of the current search.

7. The method of claim 1, further comprising:
retrieving the second search result from a search results database, and wherein the retrieving is performed periodically according to a pre-defined frequency.

8. The method of claim 1, wherein the communicating of the notification includes sending an email notification of the data item to an email address hosted by an email server, the email notification being retrievable from the email server by the user device, the email notification indicating the change relative to the second search result.

9. The method of claim 1, further comprising:
detecting a further data item within the first search result that is the same as the second search result; and
communicating a message notifying that that the further data item within the first search result is the same as the second search result.

10. A system comprising:
a processor configured by an update notification engine to identify a data item that is changed within a first search result relative to a second search result, the data item being absent from the second search result and corresponding to a listed item; and
a notification module configured to communicate a notification of the data item to a user device.

11. The system of claim 10, wherein the update notification engine is further configured to:
compare the first search result with the second search result; and
identify the data item within the first search result based on the comparison.

12. The system of claim 11, wherein the update notification engine is further configured to:
parse the first search result and perform a checksum on the parsed first search result.

13. The system of claim 11, wherein the update notification engine is further configured to tag the data item as being absent from the second search result.

14. The system of claim 13, wherein the notification module is further configured to transmit the data item tagged as being the listed item.

15. The system of claim 10, wherein the update notification engine is further configured to:
receive search criteria from the user device; and
perform a current search based on the search criteria from the user device; and
retrieve the first search result in response to the performing of the current search.

16. The system of claim 10, wherein the update notification engine is further configured to:
retrieve the second search result from a search results database, and wherein the retrieving is performed periodically according to a pre-defined frequency.

17. The system of claim 10, wherein the notification module is further configured to send an email notification of the data item to an email address hosted by an email server, the email notification being retrievable from the email server by the user device, the email notification indicating the change relative to the second search result.

18. The system of claim 10, wherein the update notification engine is further configured to detect that a further data item within a first search result that is the same as the second search result, and wherein the notification module is further configured to communicate a message notifying that the further data item within the first search result is the same as the second search result.

19. A non-transitory machine-readable medium storing instructions that, when executed by one or more processors of a machine, cause the machine to perform operations comprising:
identifying a data item that is changed within a first search result relative to a second search result, the data item being absent from the second search result and corresponding to a listed item; and
communicating a notification of the data item to a user device.

* * * * *